United States Patent
Saito et al.

(10) Patent No.: US 6,787,117 B1
(45) Date of Patent: Sep. 7, 2004

(54) POROUS HOLLOW FIBER MEMBRANE HAVING CHELATE FORMABILITY AND METHOD FOR RECOVERY OF GERMANIUM OXIDE USING THE POROUS HOLLOW FIBER MEMBRANE

(75) Inventors: Kyoichi Saito, Tokyo (JP); Katuyuki Sato, Hokkaido (JP); Mitsuo Akiba, Tokyo (JP)

(73) Assignee: Asai Germanium Research Institute Co., Ltd., Kawasaki (JP)

( * ) Notice: Subject to any disclaimer, the term of this patent is extended or adjusted under 35 U.S.C. 154(b) by 0 days.

(21) Appl. No.: 09/959,677
(22) PCT Filed: Apr. 27, 2000
(86) PCT No.: PCT/JP00/02772
§ 371 (c)(1), (2), (4) Date: Dec. 20, 2001
(87) PCT Pub. No.: WO00/67905
PCT Pub. Date: Nov. 16, 2000

(30) Foreign Application Priority Data

May 7, 1999 (JP) ............................................. 11-127459

(51) Int. Cl.⁷ .......................... C01G 17/00; C08G 63/48
(52) U.S. Cl. ............................. 423/89; 525/59; 525/63; 525/64; 525/65; 430/1; 521/27
(58) Field of Search .............................. 423/89; 525/59, 525/63, 64, 65; 430/1; 521/27

(56) References Cited

U.S. PATENT DOCUMENTS 3,144,397 A  *  8/1964  Stamberg et al.
5,087,372 A      2/1992  Toyomoto et al. ........... 210/651

FOREIGN PATENT DOCUMENTS

| EP | 0 713 933 A1 | 5/1996 |
|---|---|---|
| JP | 5-111685 A | 5/1993 |
| JP | 5-57209 B | 8/1993 |
| JP | 7-24314 A | 1/1995 |
| JP | 8-199480 A | 8/1996 |

* cited by examiner

Primary Examiner—Steven Bos
(74) Attorney, Agent, or Firm—Kubovcik & Kubovcik

(57) ABSTRACT

There are provided a porous hollow fiber membrane capable of economically and efficiently recovering germanium which has heretofore been entirely disposed as a waste, and a method for recovery of germanium oxide using such a porous hollow fiber membrane.

The porous hollow fiber membrane of the present invention is characterized by being obtained by reacting the residue of an epoxy group-containing compound subjected to irradiation-induced graft polymerization on a polyethylene-made porous hollow fiber membrane, with a compound capable of reacting with said reside to give a residue containing a structure represented by the following formula:

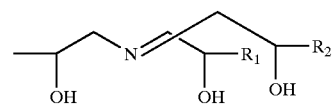

(wherein $R_1$ and $R_2$ are a hydrogen atom or a lower alkyl group) or the following formula:

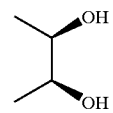

and the method for recovery of germanium oxide according to the present invention is characterized by contacting an aqueous germanium oxide solution with the above porous hollow fiber membrane having chelate formability, to allow the porous hollow fiber membrane having chelate formability, to capture the germanium oxide contained in the aqueous solution, and then dissolving the captured germanium oxide into an acidic solution.

5 Claims, 3 Drawing Sheets

POROUS HOLLOW FIBER MEMBRANE HAVING CHELATE FORMABILITY AND METHOD FOR RECOVERY OF GERMANIUM OXIDE USING THE POROUS HOLLOW FIBER MEMBRANE

TECHNICAL FIELD

The present invention relates to a porous hollow fiber membrane having chelate formability, as well as to a method for recovery of germanium oxide using the porous hollow fiber membrane.

BACKGROUND ART

Germanium is an element indispensable in various fields, for development of materials for high-technology industries such as optical fiber, solar cell and the like, or as a polymerization promotion catalyst in production of polyethylene terephthalate resin, or as a raw material for production of biologically active substance.

Recently, the supply of germanium has been unable to meet the demand and the demand and supply has become unbalanced, and this situation has been taken up as a serious problem. In Japan, the supply of germanium has been almost dependent upon import. Therefore, if the used germanium which has been entirely disposed as a waste, can be recovered by any method, it will improve the demand and supply balance of germanium and moreover is preferred from the standpoint of reutilization of resource.

Up to now, however, there has been made no proposal on any effective method for recovery of germanium, particularly germanium oxide which is used as a catalyst per se or as a raw material for germanium of various applications; and development for such an effective method has been desired.

The present invention aims at solving the above-mentioned problems of the prior art and providing a porous hollow fiber membrane capable of economically and efficiently recovering used germanium, particularly used germanium oxide heretofore disposed entirely as a waste and a method for economical and efficient recovery of germanium, particularly germanium oxide using such a porous hollow fiber membrane.

DISCLOSURE OF THE INVENTION

The porous hollow fiber membrane employed by the present invention in order to achieve the above aim is characterized by being obtained by reacting the residue of an epoxy group-containing compound subjected to irradiation-induced graft polymerization on a polyethylene-made porous hollow fiber membrane, with a compound capable of reacting with said reside to give a residue containing a structure represented by the following formula:

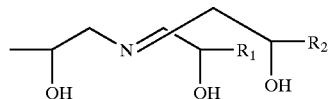

(wherein $R_1$ and $R_2$ are a hydrogen atom or a lower alkyl group) or the following formula:

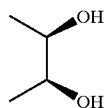

The method for recovering germanium oxide using a porous hollow fiber membrane, also employed by the present invention is characterized by contacting an aqueous germanium oxide solution with the above-mentioned porous hollow fiber membrane having chelate formability, to allow the porous hollow fiber membrane having chelate formability to capture the germanium oxide contained in the aqueous solution, and then dissolving the captured germanium oxide into an acidic solution.

BEST MODE FOR CARRYING OUT THE INVENTION

Figure 1:
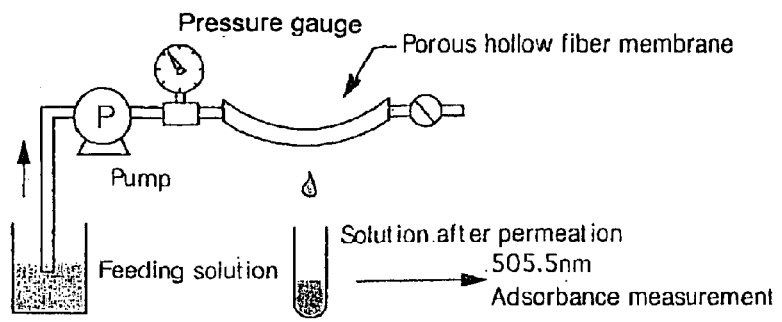
FIG. 1 is a conceptual drawing of a permeation apparatus used for examining the germanium oxide adsorbability of a porous hollow fiber membrane.

Hereinafter, the present invention is described in detail.

The polyethylene-made porous hollow fiber membrane used in the present invention is a polyethylene-made hollow fiber membrane (this is also called "hollow yarn" or "hollow fiber") having a large number of pores communicating from the inner wall to the outer wall, and can be produced by an extraction method or a stretching method. It is convenient to use a commercial product as such a membrane.

In order to produce a porous hollow fiber membrane having chelate formability, of the present invention, an epoxy group-containing compound is polymerized on the above-mentioned polyethylene-made porous hollow fiber membrane. This polymerization is conducted by irradiation-induced graft polymerization.

In the irradiation-induced graft polymerization, a polyethylene radical is generated by the use of a radiation such as electron beam, gamma-ray or the like and it is reacted with a monomer (an epoxy group-containing compound in the present invention).

As the epoxy group-containing compound, there can be mentioned, for example, glycidyl methacrylate. When this compound is subjected to irradiation-induced graft polymerization on the above-mentioned polyethylene-made porous hollow fiber membrane, there can be obtained a polyethylene-made porous hollow fiber membrane having the reside of an epoxy group-containing compound, which has the following structure.

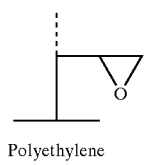

Polyethylene

The amount of the epoxy group-containing compound used is, when the compound is, for example, glycidyl methacrylate, about 4.0 moles in terms of epoxy group amount per kg of the resulting porous hollow fiber membrane. By controlling the amount of the epoxy group-containing compound used, the epoxy group amount in the resulting porous hollow fiber membrane can be controlled.

Then, the residue of an epoxy group-containing compound in the polyethylene-made porous hollow fiber membrane having the residue of an epoxy group-containing compound is reacted, in a first case, with a compound capable of reacting with the residue to give a residue containing a structure represented by the following formula:

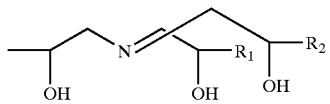

whereby is obtained a first porous hollow fiber membrane having chelate formability, of the present invention.

In the above formula, $R_1$ and $R_2$ may be the same or different and are each a hydrogen atom or a lower alkyl group.

The compound used for obtaining the above first porous hollow fiber membrane is not critical as long as it can give a residue containing a structure represented by the above formula. The compound includes, for example, 2,2-iminodiethanol and di-2-propanolamine.

When 2,2-iminodiethanol is used, the first porous hollow fiber membrane having chelate formability, of the present invention has the following structure:

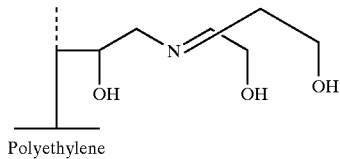

Polyethylene and, when di-2-propanolamine is used, the following structure.

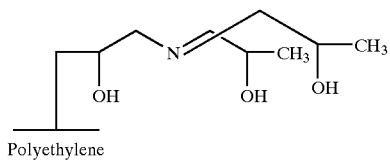

Polyethylene

The first porous hollow fiber membrane can be produced, for example, by immersing the polyethylene-made porous hollow fiber membrane having the residue of an epoxy group-containing compound, in a solution of a compound used for obtaining the first porous hollow fiber membrane, to add the latter compound to the epoxy group of the polyethylene-made porous hollow fiber membrane. The amount of the structure of chelate formability in the first porous hollow fiber membrane obtained can be controlled by controlling the use amount of the compound used for obtaining the first porous hollow fiber membrane.

The first porous hollow fiber membrane having chelate formability, of the present invention, when used for germanium oxide, captures germanium oxide to form a germatrane structure as shown below.

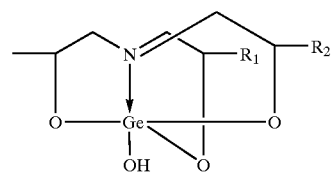

Meanwhile, in a second case, the residue of an epoxy group-containing compound in the polyethylene-made porous hollow fiber membrane having the residue of an epoxy group-containing compound is reacted with a compound capable of reacting with the residue to give a residue containing a structure (a cis-1,2-diol structure) represented by the following formula:

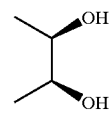

whereby can be obtained a second porous hollow fiber membrane having chelate formability, of the present invention.

The compound used for obtaining the above second porous hollow fiber membrane is not critical as long as it can give a residue containing a structure represented by the above formula. The compound includes, for example, N-methylglucamine and 3-amino-1,2-propanediol.

When N-methylglucamine is used, the second porous hollow fiber membrane having chelate formability, of the present invention, has the following structure:

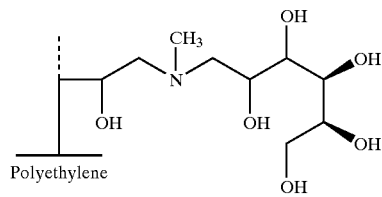

Polyethylene and, when 3-amino-1,2-propanediol is used, the following structure.

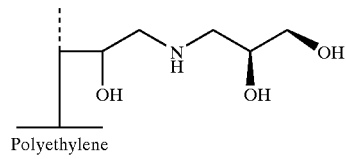

Polyethylene

The second porous hollow fiber membrane can be produced, for example, by immersing the polyethylene-made porous hollow fiber membrane having the residue of an epoxy group-containing compound, in a solution of a compound used for obtaining the second porous hollow fiber membrane, to add the latter compound to the epoxy group of the polyethylene-made porous hollow fiber membrane. The amount of the structure of chelate formability in the second porous hollow fiber membrane obtained can be controlled by controlling the use amount of the compound used for obtaining the second porous hollow fiber membrane.

The second porous hollow fiber membrane having chelate formability, of the present invention, when used for germanium oxide, captures germanium oxide to form a complex with a cis-1,2-diol structure as shown below.

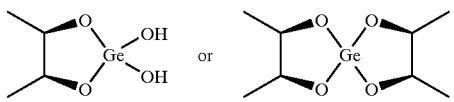

In recovering germanium using the thus-obtained porous hollow fiber membrane having chelate formability, of the present invention, first, an aqueous solution containing, for example, germanium oxide is contacted with the porous hollow fiber membrane having chelate formability to allow the membrane to capture germanium oxide. Specifically, the aqueous solution containing, for example, germanium oxide is allowed to permeate through the porous hollow fiber membrane having chelate formability, of the present invention from the inner wall to the outer wall.

The permeation of the aqueous solution containing germanium oxide through the porous hollow fiber membrane from the inner wall to the outer wall can be conducted, for example, by allowing a 0.01 wt. % aqueous germanium oxide solution adjusted to pH 3 to 12 with sodium hydroxide or hydrochloric acid, to permeate at a particular pressure and a particular temperature and then, as necessary, washing the resulting membrane with water.

By the above permeation of the aqueous germanium oxide solution through the porous hollow fiber membrane from the inner wall to the outer wall, germanium oxide becomes the above-mentioned germatrane structure or the above-mentioned complex with a cis-1,2-diol structure and is captured by the porous hollow fiber membrane having chelate formability, of the present invention.

Finally, the captured germanium oxide is dissolved into an acidic solution to complete recovery of germanium oxide from the aqueous germanium oxide solution. As the acidic solution, there can be mentioned, for example, hydrochloric acid of about 1 M.

The elution of the captured germanium oxide into the acidic solution can be conducted, for example, by allowing the acidic solution to permeate through the porous hollow fiber membrane from the inner wall to the outer wall, as in the case of germanium oxide capture.

The present invention is described in more detail below by way of Examples.

1. Production of Porous Hollow Fiber Membranes Having Chelate Formability

A polyethylene-made porous hollow fiber membrane (inner diameter=1.8 mm, outer diameter=3.1 mm, pore diameter=0.3 μm, porosity=70%) was irradiated with 200 KGy of a radiation in a nitrogen atmosphere at room temperature. The irradiated membrane was placed in a glass ampoule containing a methanol solution of glycidyl methacrylate, and graft polymerization of glycidyl methacrylate was allowed to take place at 40° C. to obtain a glycidyl methacrylate membrane (hereinafter referred to as GMA membrane) containing 4.0 moles of epoxy group per kg of GMA membrane.

1-1) Production of Iminodiethanol Membrane

The GMA membrane obtained above by irradiation-induced graft polymerization was immersed in a 50 vol. % aqueous iminodiethanol solution at 338 K (65° C.) to add iminodiethanol group to the epoxy group of the GMA membrane (the resulting membrane is hereinafter referred to as IDE membrane).

1-2) Production of Diisopropanolamine Membrane

The GMA membrane was also immersed in a 1 M aqueous diisopropanolamine solution at 338 K (65° C.) to add diisopropanolamine group to the epoxy group of the GMA membrane (the resulting membrane is hereinafter referred to as DPA membrane).

1-3) Production of N-methylglucamine Membrane

The GMA membrane was also immersed in an aqueous solution containing 0.5 M of N-methylglucamine and 50 v/v % of dioxane-water at 353 K (80° C.) to add N-methylglucamine group to the epoxy group of the GMA membrane (the resulting membrane is hereinafter referred to as NMG membrane)

1-4) Production of 3-amino-1,2-propanediol Membrane

The GMA membrane was also immersed in an aqueous solution containing 1 M of 3-amino-1,2-propanediol and 50 v/v % of dioxane-water at 353 K (80° C.) to add 3-amino-1,2-propanediol group to the epoxy group of the GMA membrane (the resulting membrane is hereinafter referred to as APD membrane).

2. Confirmation of Structures of Porous Hollow Fiber Membranes Having Chelate Formability The structures of the membranes obtained above were confirmed using the IR spectra of the membranes. That is, by converting the GMA membrane into the IDE membrane, the DPA membrane, the NMG membrane and the APD membrane, the absorption of epoxy group at 847 cm$^{-1}$ and 909 cm$^{-1}$ disappeared and new absorption of hydroxyl group appeared at 3,000 to 3,500 cm$^{-1}$. The IR spectral data of the individual membranes are given below.

GMA membrane (grafting degree of base material= 155.5%)

2920 cm$^{-1}$, 2851 cm$^{-1}$ (stretching vibration of CH)

1734 cm$^{-1}$ (CO group)

1490 cm$^{-1}$, 1262 cm$^{-1}$, around 1150 cm$^{-1}$, 995 cm$^{-1}$ 762 cm$^{-1}$ 909 cm$^{-1}$ (antisymmetric ring stretching vibration of epoxy)

847 cm$^{-1}$ (antisymmetric ring stretching vibration of epoxy)

IDE membrane (conversion percentage=98%)

3000 to 3500 cm$^{-1}$ (OH group)

2917 cm$^{-1}$, 2851 cm$^{-1}$ (stretching vibration of CH)

1725 cm$^{-1}$ (CO group)

1474 cm$^{-1}$, 1250 cm$^{-1}$, around 1163 cm$^{-1}$, 1068 cm$^{-1}$

The absorption of antisymmetric ring stretching vibration of epoxy disappeared.

DPA membrane (conversion percentage=90%)

3000 to 3500 cm$^{-1}$ (OH group)

2919 cm$^{-1}$, 2851 cm$^{-1}$ (stretching vibration of CH)

1728 cm$^{-1}$ (CO group)

1474 cm$^{-1}$, 1271 cm$^{-1}$, 1150 cm$^{-1}$, 995 cm$^{-1}$

The absorption of antisymmetric ring stretching vibration of epoxy disappeared.

NMG membrane (conversion percentage=82%)

3000 to 3500 cm$^{-1}$ (OH group)

2919 cm$^{-1}$, 2851 cm$^{-1}$(stretching vibration of CH)

1717 cm$^{-1}$(CO group)

1474 cm$^{-1}$, 1260 cm$^{-1}$, 1170 cm$^{-1}$, 1084 cm$^{-1}$

The absorption of antisymmetric ring stretching vibration of epoxy disappeared.

APD membrane (conversion percentage=68%)

3000 to 3500 cm$^{-1}$(OH group)

2919 cm$^{-1}$, 2851 cm$^{-1}$ (stretching vibration of CH)

1725 cm$^{-1}$(CO group)

1474 cm$^{-1}$, 1269 cm$^{-1}$, 1168 cm$^{-1}$

The absorption of antisymmetric ring stretching vibration of epoxy disappeared.

3. Adsorption of Germanium Oxide by Porous Hollow Fiber Membranes Having Chelate Formability Each of the four kinds of porous hollow fiber membranes having chelate formability, produced above, i.e. the IDE membrane, the DPA membrane, the NMG membrane and the APD membrane was set in a permeation apparatus shown in FIG. 1. Then, the following three kinds of solutions were allowed to permeate through each apparatus set with these membranes in the following order at a constant pressure (0.1 MPa) and a constant temperature (24° C.) for the following three kinds of operations.

1) Adsorption operation: a 0.01 wt. % aqueous germanium oxide solution (adjusted to pH 3 to 12 using sodium hydroxide or hydrochloric acid)

2) Washing operation: water

3) Elution operation: 1 M hydrochloric acid

For each operation, the solution after permeation was continuously collected into a test tube; the final solution after permeation was determined for germanium concentration by a phenylfluorone method; and the amount of germanium adsorbed by the porous hollow fiber membrane was calculated from a difference between the germanium concentration in feeding solution and the germanium concentration in solution after permeation.

4. Results 4-1) Comparison of Germanium Amounts Adsorbed

Figure 2:
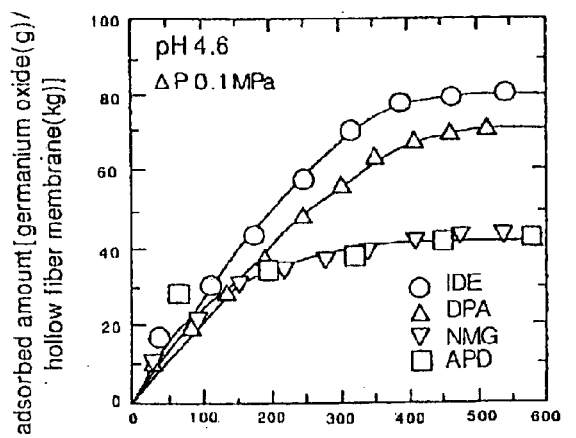
FIG. 2 is a graph of adsorption curves each showing the adsorption amount of germanium when an aqueous germanium solution was allowed to permeate through a porous hollow fiber membrane.

The adsorbed amount of germanium when an aqueous germanium oxide solution was allowed to permeate through each porous hollow fiber membrane (the IDE membrane, the DPA membrane, the NMG membrane or the APD membrane), is shown in FIG. 2 as a adsorbed amount curve; and the adsorbability of each porous hollow fiber membrane when the initial pH of the aqueous germanium oxide solution was 4.6, is shown in Table 1.

TABLE 1

| Hollow fiber membrane (functional group) | Initial pH | Adsorbed amount (mmol/g) | Elution amount (mmol/g) | Elution percentage (%) | Bonded mole ratio (Ge amount/ functional group amount) |
|---|---|---|---|---|---|
| DPA membrane | 4.6 | 1.0 | 1.0 | 99 | 0.74 |
| NMG membrane | 4.6 | 0.6 | 0.6 | 100 | 0.55 |
| APD membrane | 4.6 | 0.6 | 0.5 | 73 | 0.42 |
| IDE membrane | 4.6 | 1.2 | 1.2 | 99 | 0.85 |
|  | 3.2 | 1.1 | 1.1 | 100 | 0.70 |

TABLE 1-continued

| Hollow fiber membrane (functional group) | Initial pH | Adsorbed amount (mmol/g) | Elution amount (mmol/g) | Elution percentage (%) | Bonded mole ratio (Ge amount/ functional group amount) |
|---|---|---|---|---|---|
|  | 7.8 | 1.2 | 1.2 | 100 | 0.88 |
|  | 11.7 | 0.1 | 0.1 | 99 | 0.26 |

As is clear from FIG. 2 and Table 1, the IDE membrane gave the highest adsorbed amount (1.2 mol per kg of the membrane), and the adsorbabilities of the IDE membrane and the DPA membrane were higher than those of the NMG membrane and the APD membrane.

The above "DEV (Dimensionless Effluent Volume)" refers to (amount of solution after permeation)/(membrane volume excluding hollow portion).

The elution percentage was nearly 100% in all the porous hollow fiber membranes, which indicated that they allow repeated adsorption and desorption.

4-2) pH Dependency of Germanium Adsorbability of IDE Membrane

Figure 3:
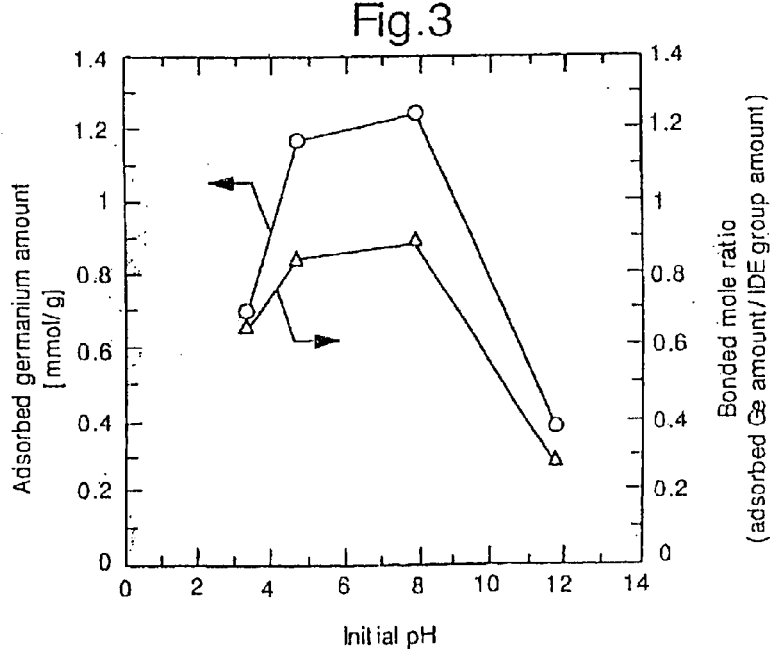
FIG. 3 is a graph showing the pH dependency of germanium adsorbability of IDE membrane.

In FIG. 3 is shown the pH dependency of adsorbed germanium amount of IDE membrane when the initial (when fed to IDE membrane) pH of aqueous germanium oxide solution was varied from 3.2 to 11.7. As is clear from FIG. 3 and Table 1, the adsorbed amount of germanium oxide varied in an initial pH range of 3 to 12. The mole ratio of bonded germanium to IDE group at pH 7.8 was 0.88 and about 3.4 times that at pH 11.7. These matters indicated that the adsorbed germanium oxide amount varies depending upon the initial pH of the aqueous germanium oxide solution and is optimum at pH 7.8.

Figure 4:
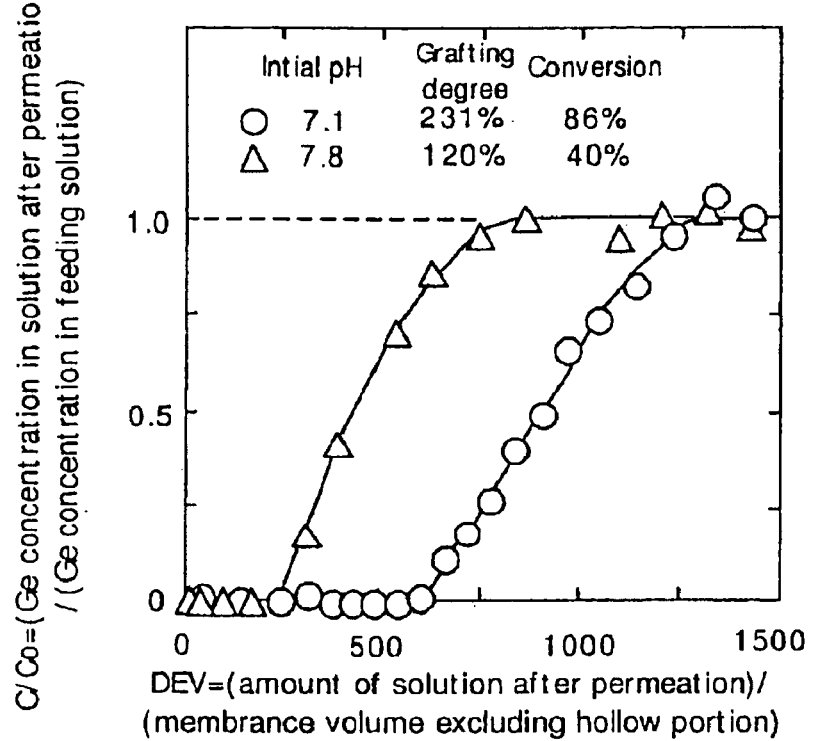
FIG. 4 is a graph showing the germanium oxide adsorbability of high-capacity IDE membrane.

5. Adsorption of Germanium Oxide by High-capacity IDE Membrane 5-1) Comparison of Adsorbed Germanium Oxide Amounts A high-capacity IDE membrane having a higher GMA grafting degree and a higher degree of conversion to IDE group (functional group density=2.9 mol/kg) for higher adsorption was subjected to the same adsorption test as in above, at an initial pH of 7.1. The resulting break-through curve of germanium oxide is shown in FIG. 4. In FIG. 4 is also shown, for comparison, the break-through curve obtained at the optimum condition (functional group density=1.3 mol/kg) in the above adsorption test.

As is clear from FIG. 4, the high-capacity IDE membrane enables high-capacity adsorption of germanium oxide.

5-2) Comparison with Chitosan Resin with Mannose Side Chain or with N-2,3-dihydroxypropylchitosan Resin Adsorbed germanium oxide amounts were compared between a high-capacity IDE membrane and a chitosan resin with mannose side chain or an N-2,3-dihydroxypropylchitosan resin (these resins are known to adsorb metals and described in Chitin-Chitosan Study, Vol. 4, No. 2, 1998). The results are shown in Table 2. It is clear from Table 2 that the high-capacity IDE membrane gave an adsorbed Ge amount of 2.7 mol/kg (196 g/kg) which is about 2.3 times that of ordinary IDE membrane and higher than those of the chitosan-based resins.

TABLE 2

| Germanium adsorbent | Base resin | Initial pH | Adsorbed amount (mol/kg) | Elution amount (mol/kg) | Elution percentage (%) | Grafting degree (%) | Conversion percentage (%) |
|---|---|---|---|---|---|---|---|
| IDE membrane | Polyethylene | 7.1 | 2.7 | 2.7 | 100 | 213 | 86 |
| Chitosan resin with mannose side chain | Chitosan | 7.2 | 2.4 | | | | |
| N-2,3-dihydroxy-propylchitosan resin | Chitosan | 3.9 | 1.4 | | | | |

5-3) Flow Amount Dependency of Adsorption of IDE Membrane

Figure 5:
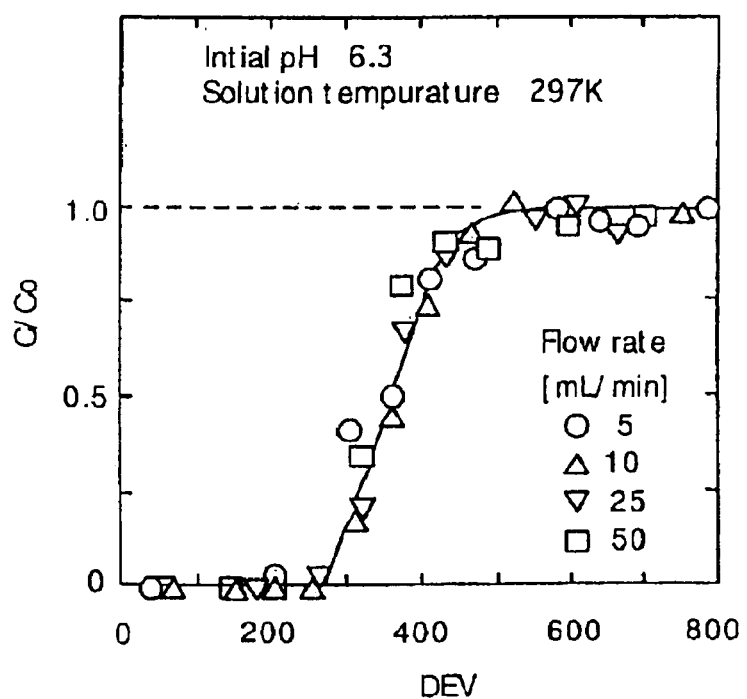
FIG. 5 is a graph showing the flow amount dependency of adsorbability of IDE membrane.

An aqueous germanium oxide solution (initial pH=6.3) was allowed to permeate through an IDE membrane at a flow rate of 5, 10, 25 and 50 ml/min. The resulting break-through curves of Ge are shown in FIG. 5. When the flow rate varied up to tenfold, there was no change in shape of break-through curve and therefore in adsorbed amount. This indicates that the diffusion transfer resistance in a direction perpendicular to the thickness direction of membrane is negligibly small. Incidentally, the adsorbed amount of germanium oxide was 0.99 mol/kg (72.1 g/kg) (a four-time average) and the mole ratio of bonded germanium oxide to DetA (Diethyl amino moiety) group was 0.72.

5-4) Adsorbability of IDE Membrane in Repeated Use

Figure 6:
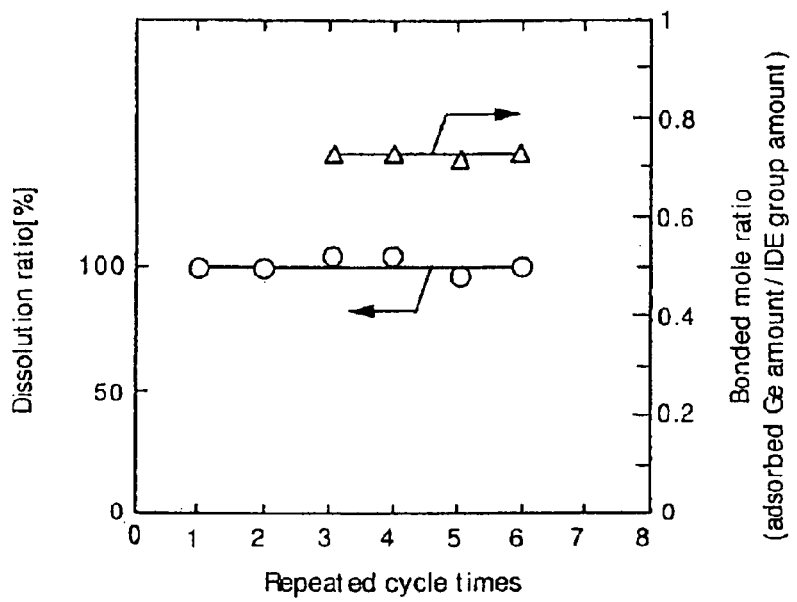
FIG. 6 is a graph showing the adsorbability of IDE membrane in repeated use.

An adsorption-elution-regeneration cycle was repeated six times (six cycles) for an IDE membrane. The elution percentage after each cycle and the bonded mole ratios after the third, fourth, fifth and sixth cycles are shown in FIG. 6. The elution percentages after individual cycles were constant at about 100% and there was no change in the adsorbed Ge amounts after the third, fourth, fifth and sixth cycles. As a result, it became clear that the IDE membrane enables repeated adsorption-elution-regeneration cycles, the adsorption capacity and the elution ratio remain unchanged even when the times of the adsorption-elution-regeneration cycle increase, and the IDE membrane is an industrially usable adsorbent.

5-5) Dissolvability from IDE Membrane

Figure 7:
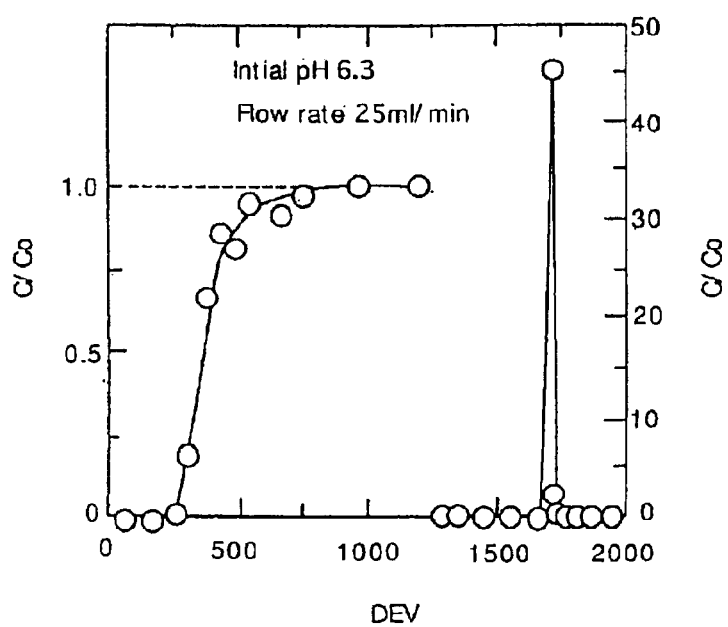
FIG. 7 is a graph showing the dissolvability from IDE membrane.

In order to examine the dissolvability from IDE membrane, an aqueous germanium oxide solution (initial pH=6.3) was allowed to permeate through an IDE membrane and then a elution operation was conducted in such a condition that the volume of the solution after elution operation became 1/10 of the volume of the solution after permeation. The resulting elution curve is shown in FIG. 7. It was possible to concentrate from the peak concentration of the solution after elution to about 45 times the concentration of the feeding solution; and 90% of the adsorbed germanium oxide could be dissolved using 1 M hydrochloric acid of 3 times the membrane volume (about 0.4 ml) and 100% could be dissolved using 1 M hydrochloric acid of 30 times the membrane volume (about 0.4 ml).

Thus, the porous hollow fiber membrane having chelate formability, of the present invention can adsorb germanium oxide efficiently. By using this porous hollow fiber membrane in the form of a module, germanium oxide can be recovered quickly and in a large amount, and the membrane can be used repeatedly.

Industrial Applicability

The porous hollow fiber membrane having chelate formability, of the present invention has a functional group having chelate formability, for example, a triethanolamine structure or a di- or polyol structure and can therefore adsorb germanium oxide at a high efficiency.

Further, the germanium oxide adsorbed by the porous hollow fiber membrane having chelate formability, of the present invention, when subjected to an acid treatment, can be dissolved substantially by 100%; therefore, the present membrane can be used repeatedly for adsorption and desorption of germanium oxide.

What is claimed is:

1. A porous hollow fiber membrane having chelate formability, obtained by reacting the residue of an epoxy group-containing compound subjected to irradiation-induced graft polymerization on a polyethylene-made porous hollow fiber membrane, with a compound capable of reacting with said residue to give a residue containing a structure represented by the following formula:

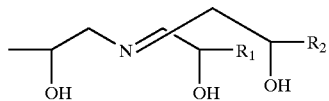

wherein R1 and R2 are a hydrogen atom or a lower alkyl group or the following formula:

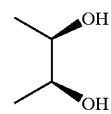

2. A porous hollow fiber membrane having chelate formability according to claim 1, wherein the epoxy group-containing compound subjected to irradiation-induced graft polymerization is glycidyl methacrylate.

3. A porous hollow fiber membrane having chelate formability according to claim 1, wherein the compound capable of giving a residue containing a structure represented by the following formula:

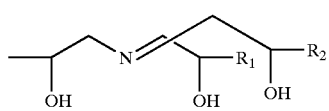

wherein R1 and R2 are a hydrogen atom or a lower alkyl group is 2,2-iminodiethanol or di-2-propanolamine.

4. A porous hollow fiber membrane having chelate formability according to claim 1, wherein the compound capable of giving a residue containing a structure represented by the following formula:

11

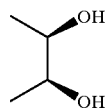

is N-methylglucamine or 3-amino-1,2-propanediol.

5. A method for recovering germanium oxide using a porous hollow fiber membrane having chelate formability, which is characterized by contacting an aqueous germanium oxide solution with a porous hollow fiber membrane having chelate formability, obtained by reacting the residue of an epoxy group-containing compound subjected to irradiation-induced graft polymerization on a polyethylene-made porous hollow fiber membrane, with a compound capable of reacting with said residue to give a residue containing a structure represented by the following formula:

12

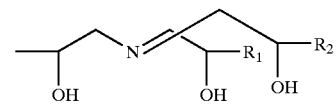

wherein R1 and R2 are a hydrogen atom or a lower alkyl group or the following formula:

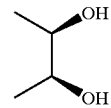

to allow the porous hollow fiber membrane having chelate formability, to capture the germanium oxide contained in the aqueous solution, and then dissolving the captured germanium oxide with an acidic solution.

* * * * *